(12) United States Patent
Maier et al.

(10) Patent No.: US 11,374,473 B2
(45) Date of Patent: Jun. 28, 2022

(54) EC MOTOR FOR AN ELECTRIC HAND TOOL AND METHOD FOR PRODUCING A ROTOR FOR AN EC MOTOR

(71) Applicant: C. & E. Fein GmbH, Schwaebisch Gmuend-Bargau (DE)

(72) Inventors: Christoph Maier, Notzingen (DE); Martin Adamczyk, Aalen (DE); Thomas Burkhardt, Heubach (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 96 days.

(21) Appl. No.: 16/674,802

(22) Filed: Nov. 5, 2019

(65) Prior Publication Data
US 2020/0144898 A1    May 7, 2020

(30) Foreign Application Priority Data
Nov. 5, 2018    (DE) ...................... 10 2018 127 501.3

(51) Int. Cl.
*H02K 15/03*    (2006.01)
*H02K 1/276*    (2022.01)
(Continued)

(52) U.S. Cl.
CPC ............. *H02K 15/03* (2013.01); *H02K 1/276* (2013.01); *H02K 15/12* (2013.01); *H02K 15/165* (2013.01); *H02K 2201/09* (2013.01)

(58) Field of Classification Search
CPC ........ H02K 15/03; H02K 1/276; H02K 15/12; H02K 15/165; H02K 2201/09
See application file for complete search history.

(56) References Cited

U.S. PATENT DOCUMENTS

| 5,045,742 A | * | 9/1991 | Armstrong | ............. | H02K 23/40 |
| | | | | | 310/216.069 |
| 5,166,567 A | * | 11/1992 | Kneisley | .................. | B23K 9/06 |
| | | | | | 219/133 |

(Continued)

FOREIGN PATENT DOCUMENTS

| CN | 103607084 B | * | 9/2015 | ............. H02K 1/278 |
| DE | 19510291 A1 | | 9/1996 | |

(Continued)

OTHER PUBLICATIONS

J Pyrhonen, IEEE Transactions on Magnetics, vol. 46, No. 10, Oct. 2010, pp. 3783-3789 (Year: 2010).*

*Primary Examiner* — Peter Dungba Vo
*Assistant Examiner* — Jose K Abraham
(74) *Attorney, Agent, or Firm* — Muncy, Geissler, Olds & Lowe, P.C.

(57) ABSTRACT

An EC motor for an electric hand tool having a stator in which a rotor is rotatably mounted, which comprises a rotor lamination stack, which has a passage opening and is formed of individual laminations, and a rotor shaft which is cast in the passage opening of the rotor lamination stack by means of a casting compound, and having a plurality of permanent magnets, which are received in the pockets formed in the rotor lamination stack. An annular channel, which is connected to the pockets in a fluid-conducting manner via radial channels, each of which is formed of a plurality of channel sections formed in adjacent laminations of the rotor lamination stack, is formed between the rotor shaft and the wall of the passage opening for supplying the casting compound from the annular channel to the pockets. A method is also provided for producing a rotor for an EC motor.

12 Claims, 3 Drawing Sheets

(51) Int. Cl.
*H02K 15/12* (2006.01)
*H02K 15/16* (2006.01)

(56) References Cited

U.S. PATENT DOCUMENTS

| | | | |
|---|---|---|---|
| 7,808,147 | B2 | 10/2010 | Riedl et al. |
| 9,318,932 | B2 | 4/2016 | Purohit et al. |
| 9,410,586 | B2 | 8/2016 | Esenwein |
| 9,450,472 | B2 | 9/2016 | Hatfield et al. |
| 9,812,930 | B2 | 11/2017 | Purohit et al. |
| 10,056,806 | B2 | 8/2018 | Hatfield et al. |
| 2002/0066632 | A1 | 6/2002 | Kristen et al. |
| 2015/0026966 | A1 | 1/2015 | Fang et al. |
| 2016/0049837 | A1* | 2/2016 | Helbling .................. H02K 1/30 310/156.22 |
| 2018/0034346 | A1 | 2/2018 | Purohit et al. |
| 2018/0323681 | A1 | 11/2018 | Hatfield et al. |
| 2019/0044415 | A1 | 2/2019 | Hatfield et al. |
| 2019/0356187 | A1* | 11/2019 | Frohlich ................ H02K 1/276 |

FOREIGN PATENT DOCUMENTS

| | | | | |
|---|---|---|---|---|
| DE | 102007666213 | A1 | 10/2008 | |
| DE | 102008000771 | A1 * | 10/2008 | ............... H02K 1/28 |
| DE | 102009054584 | A1 | 6/2011 | |
| DE | 102010043186 | A1 | 5/2012 | |
| DE | 102011005809 | A1 | 9/2012 | |
| DE | 102015110267 | A1 | 12/2016 | |
| DE | 102016225180 | A1 * | 6/2018 | ............ H02K 1/185 |
| DE | 102016225180 | A1 | 6/2018 | |
| EP | 0072610 | A2 | 2/1983 | |
| EP | 1961525 | A1 | 8/2008 | |
| EP | 1981149 | A2 | 10/2008 | |
| EP | 3316453 | A1 | 5/2018 | |
| JP | 2007306726 | A | 11/2007 | |
| JP | 2015126659 | A | 7/2015 | |
| JP | 2015126659 | A * | 7/2015 | |
| JP | 2015192576 | A * | 11/2015 | |
| WO | WO-2016181969 | A1 * | 11/2016 | ............ B29C 45/40 |

* cited by examiner

EC MOTOR FOR AN ELECTRIC HAND TOOL AND METHOD FOR PRODUCING A ROTOR FOR AN EC MOTOR

This nonprovisional application claims priority under 35 U.S.C. § 119(a) to German Patent Application No. 10 2018 127 501.3, which was filed in Germany on Nov. 5, 2018, and which is herein incorporated by reference.

BACKGROUND OF THE INVENTION

Field of the Invention

The present invention relates to an EC motor for an electric hand tool having a stator in which a rotor is rotatably mounted, which comprises a rotor lamination stack, which has a passage opening and is formed of individual laminations, and a rotor shaft which is cast in the passage opening of the rotor lamination stack by means of a casting compound, and having a plurality of permanent magnets, which are received in pockets formed in the rotor lamination stack. In addition, the invention relates to a method for producing a rotor for an EC motor.

Description of the Background Art

An EC motor is known, for example, from EP 1 981 149 A2, which corresponds to U.S. Pat. No. 7,808,147, in which the laminations have various recesses which are either closed or open toward the inner hole in which the rotor shaft is received. These laminations are arranged alternately to facilitate casting of the permanent magnets received in the recesses.

In the EC motors known from the prior art, however, it has been found to be disadvantageous that the assembly of the EC motor is made more difficult by the alternating arrangement of the laminations, because they must first be aligned accordingly. In addition, the limited cross section of the individual feeds ultimately also makes it more difficult for the casting compound to flow to the permanent magnets.

SUMMARY OF THE INVENTION

It is therefore an object of the present invention to reduce the aforementioned disadvantages and to provide an improved EC motor and also an improved production method.

The object related to the EC motor is achieved according to the invention with an EC motor in that an annular channel, which is connected to the pockets in a fluid-conducting manner via radial channels, each of which is formed of a plurality of channel sections formed in adjacent laminations of the rotor lamination stack, is formed between the rotor shaft and the wall of the passage opening for supplying a casting compound from the annular channel to the pockets.

This achieves, on the one hand, that the width of the radial channels, therefore, their extent in the axial direction relative to the longitudinal axis of the rotor shaft, can be increased, whereby the inflow of the casting compound to the permanent magnets received in the pockets is improved. In addition, it is also achieved by the wider radial channels that the casting compound can act radially on the permanent magnets located in the pockets in a simplified manner, whereby it is possible to dispense with a precise positioning of the permanent magnets during assembly, in particular when feeding the casting compound to the permanent magnets, because these are shifted radially outward by the casting compound. The casting compound can thus be introduced into the annular channel, from which it can then pour out via the radial channels to the pockets and there at least partially surrounds the permanent magnets and thus fixedly secures them in the pockets. The casting compound also provides electrical insulation.

It has also proved advantageous if the rotor lamination stack is constructed from laminations all of whose pocket sections are either connected to the passage opening in a fluid-conducting manner via the channel sections or are separated from the passage opening. This also reduces the fabrication cost, because an alignment of the laminations can then be substantially dispensed with. At best, it must be ensured that the pocket sections are oriented to one another. Ultimately, therefore, at least two different types of laminations are formed. In the first type, the pocket sections are connected to the passage opening in a fluid-conducting manner via the radial channel sections. In the second type, in contrast, the pocket sections are spatially separated from the passage opening. In the context of the invention, it is provided in this regard, in particular that the rotor lamination stack at least on one of the end faces, preferably on both end faces, has laminations whose pocket sections are separated from the passage opening, which improves the stability of the motor. It is also achieved hereby that the risk of leakage of the casting compound in the axial direction out of the rotor lamination stack is reduced.

It has also been shown as particularly favorable, if the proportion of the laminations having the channel sections of the total number of laminations of the rotor lamination stack is between 98% and 70%, particularly preferably between 95% and 80%. As a result, a sufficient flow around the permanent magnets contained in the pockets is achieved and at the same time the stability of the rotor lamination stack is ensured.

It has also proved to be useful if the radial channel is connected in a fluid-conducting manner to at least one axial channel formed in the pockets. As a result, the casting of the permanent magnets received in the pockets is facilitated, because the casting compound can thereby also flow in a simplified manner within the pocket in the axial direction, therefore, parallel to the longitudinal axis of the rotor shaft.

It has also proved advantageous if the axial channel and/or the radial channel are provided in each case multiple times, in particular twice, per pocket. In particular, if the radial channel is provided in duplicate per pocket, these radial channels can be separated from one another by laminations whose pocket sections are separated from the passage opening.

In particular, if multiple radial channels are provided per pocket, it has been found to be particularly favorable if the ratio between the width of the radial channel and the axial extent (L) of the annular channel as a function the number (n) of radial channels per pocket is between 70%×L/n and 98%×L/n, and particularly preferably between 80%×L/n and 95%×L/n. It is achieved hereby that the flow can be maximized and at the same time the stability of the rotor lamination stack remains ensured. The width of the radial channel also again means its extent parallel to the longitudinal axis of the passage opening.

In order to further facilitate the positioning of the permanent magnet in the pocket, it has also proved advantageous if the opening of the radial channel into the pocket is located in the center of the pocket.

It has also proved particularly advantageous if the pockets are each subdivided by a separation structure into at least one first compartment and second compartment. This facilitates the installation of the permanent magnets in the rotor lamination stack. In particular, laminations that have no pocket sections can be used as separation structures. These can also be used as a front closure. In this connection, it has also proved effective further, if the separation structure is designed such that the compartments are connected to one another in a fluid-conducting manner. This can be done, for example, in that passages which are used as separation structures through which the casting compound can pass between compartments adjacent in the axial direction are formed in the laminations.

Further, it has also proved advantageous if the width of the pocket cross section is between 2% and 15% and preferably between 5% and 10% greater than the thickness of the permanent magnet received in the pocket. As a result, flow around the permanent magnets received in the pockets is facilitated.

The installation is facilitated by the fact that the at least one axial channel is formed on the pocket sides oriented parallel to the radial channels. It is possible hereby that the casting compound can flow laterally around the permanent magnets, whereby the permanent magnets can be secured still better in the pockets.

The production cost can also be further reduced by the fact that the casting compound is formed of a thermosetting plastic. In particular, the thermosetting plastic is characterized by a simple processability and in particular by the fact that it undergoes a change in volume only to a very limited extent during curing, unlike, for example, a thermoplastic material.

The balancing quality of the rotor can be improved by arranging a balance ring on at least one of the end faces of the rotor lamination stack. It is possible hereby to compensate for any existing imbalances of the rotor by adapting the balance ring. In addition, sealing of the pockets can also be achieved by the balance rings. If the requirements for the balancing quality are relatively low, alternatively a sealing disc can also be used which has only a relatively small axial extent. In this case, this may in particular also be a magnetizable disc, which can additionally be used as a sensor.

The object related to the method for producing a rotor for an EC motor is achieved according to the invention by a method comprising the following steps: providing a rotor shaft; providing a rotor lamination stack, having a passage opening, with pockets for receiving permanent magnets; inserting the permanent magnets in the pockets of the rotor lamination stack; inserting the rotor shaft and the rotor lamination stack, centered relative to one another, in a casting mold such that an annular channel is formed between the rotor shaft, received in the passage opening, and the rotor lamination stack; closing the mold; supplying the casting compound under pressure via a sprue channel substantially exclusively in the front opening of the annular channel between the rotor shaft and the rotor lamination stack through radial channels, formed in the rotor lamination stack, into the pockets with the permanent magnets received therein; curing the casting compound; and/or removing the rotor from the mold.

Due to such a production method in which the casting compound acts radially on the permanent magnets located in the pockets, in particular a complicated securing of the permanent magnets can be dispensed with, whereby the installation effort is significantly reduced compared with conventional methods in which the casting compound is supplied to the magnets in the axial direction parallel to the longitudinal axis. In particular, it is then possible to dispense with sprue channels in the balance rings which are advantageously arranged on the end faces of the rotor lamination stack. Otherwise, when such balance rings are used, these would first have to be precisely aligned. In addition, it is possible in this method to insert the rotor lamination stack with the permanent magnets located therein and at least one of the balance rings as a preassembled unit into the mold, whereby the production of the rotor can be further simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
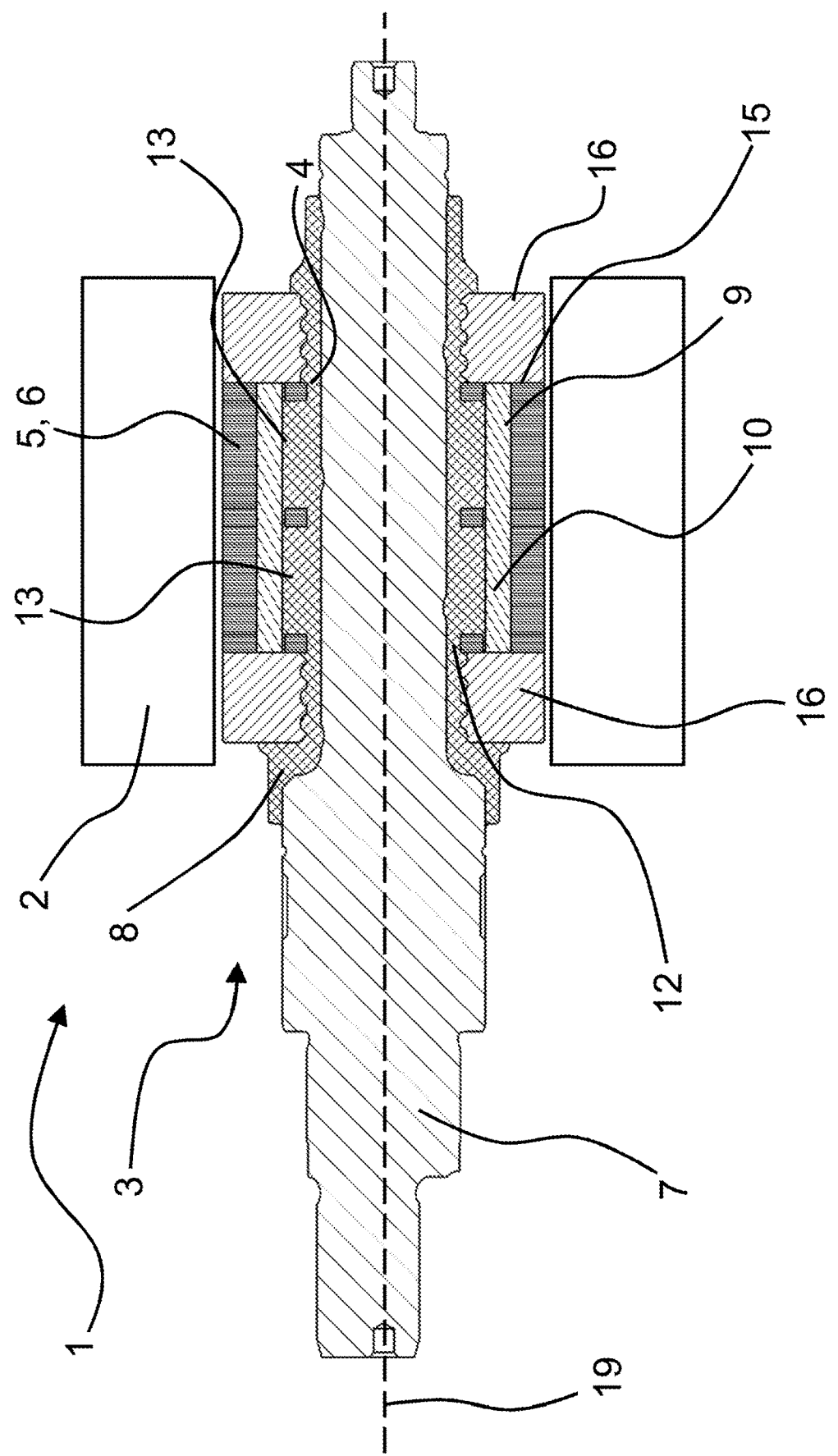
FIG. 1 shows a longitudinal section through an EC motor.

FIG. 1 shows an EC motor 1 for an electric hand tool, which comprises a stator 2 and a rotor 3 rotatably mounted therein. In this case, rotor 3 comprises a rotor lamination stack 5 which has a passage opening 4 and which is formed of individual laminations 6. A rotor shaft 7, which is connected nonrotatably by a casting compound 8 to rotor lamination stack 5, is received in passage opening 4. In the exemplary embodiment shown, casting compound 8 is formed of a thermosetting plastic. In addition, five pockets 9 are formed in the rotor lamination stack, in each of which permanent magnets 10 are received to generate torque in conjunction with stator 2 by electrical commutation. In this case, an annular channel 12, through which casting compound 8 is introduced into rotor 3, is formed between rotor shaft 7 and wall 11 of passage opening 4. Radial channels 13, through which casting compound 8 is fed from annular channel 12 radially to permanent magnets 10 located in pockets 9, are formed in turn in wall 11 of passage opening 4. Radial channels 13 in this case are formed of a plurality of channel sections 14 formed in adjacent laminations 6 of rotor lamination stack 5. In the exemplary embodiment shown, in each case a balance ring 16 is disposed on end faces 15 of rotor lamination stack 5 of EC motor 1.

Figure 2:
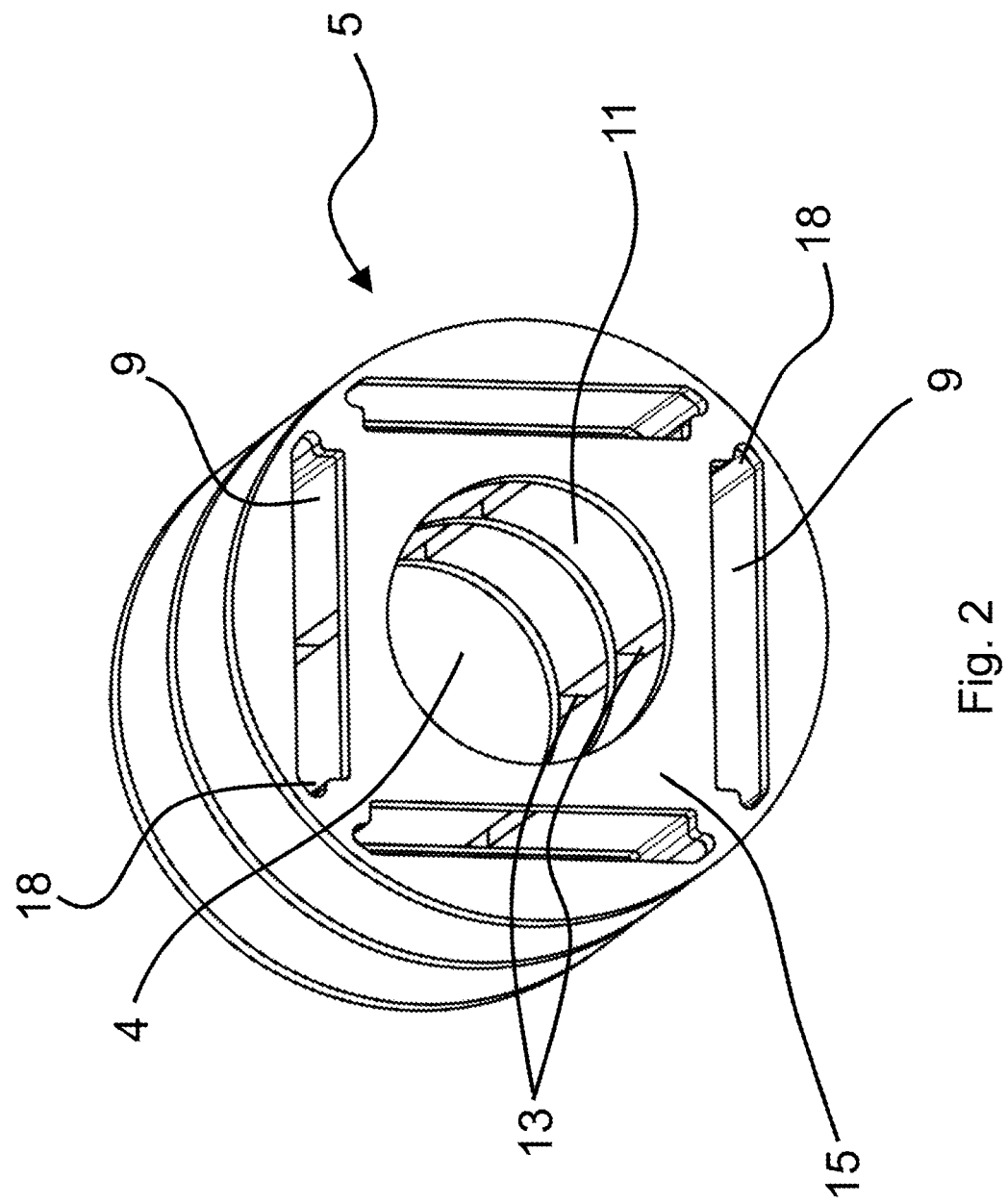
FIG. 2 is a perspective view of a rotor lamination stack.
Figure 4:
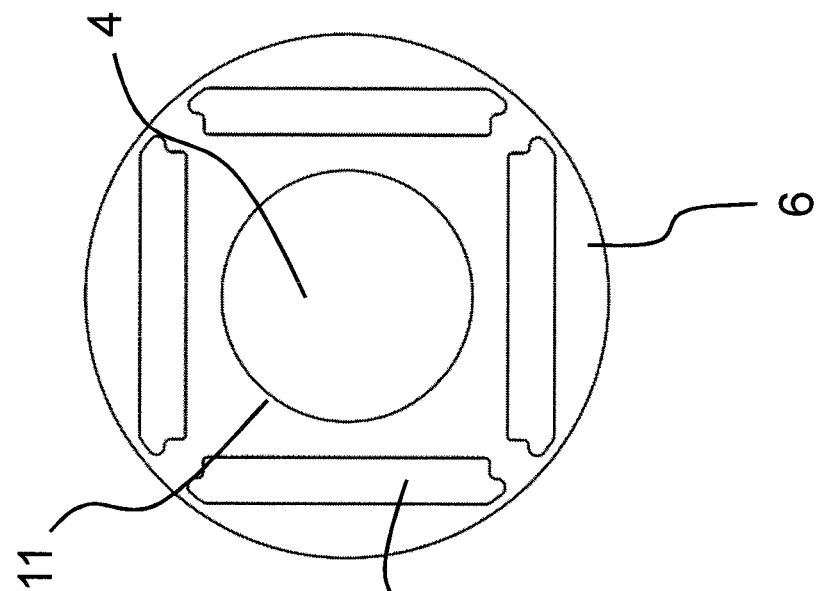
FIG. 4 is a top plan view of a second type of lamination.
Figure 3:
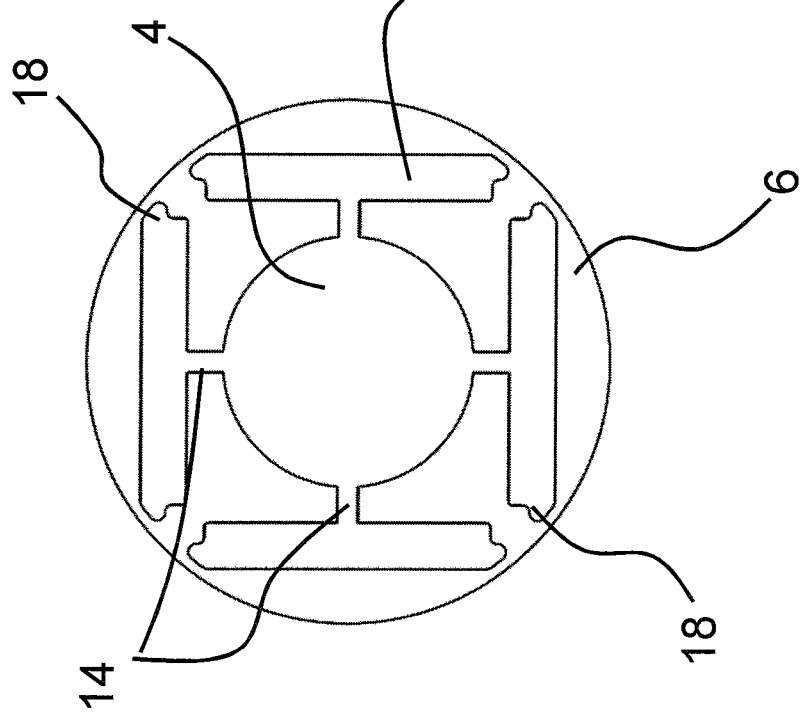
FIG. 3 is a top plan view of a first type of lamination.

As can be gathered from FIG. 2 but in particular from FIG. 3 and FIG. 4 as well, rotor lamination stack 5 is constructed from different laminations 6, which differ in their structure. Thus, in the first embodiment of lamination 6 as shown in FIG. 3, pocket sections 17 are connected to passage opening 4 in a fluid-conducting manner via channel sections 14. In the embodiment of lamination 6 as shown in FIG. 4, in contrast, pocket sections 17 are designed such that they have no connection to passage opening 4. The different laminations 6 are axially staggered in this case such that according to FIG. 4 in each case end faces 15 of rotor lamination stack 5 are formed of laminations 6. According to FIG. 3, laminations 6, in which pockets 9 are connected via channel sections 14 to passage opening 4, are then arranged between end faces 15. In the rotor lamination stack 5 shown in FIG. 2, radial channel 13 is interrupted by a plurality of laminations 6 according to FIG. 4 and divided into two parts. In this case, the proportion of laminations 6 having channel sections 14 according to FIG. 3 in the total number of laminations 6 of rotor lamination stack 5 is between 95% and 80%. It can be gathered from FIG. 2 and even more clearly from FIGS. 3 and 4 that in each case two axial channels 18, which are connected to radial channel 13 in a fluid-conducting manner, are formed in pockets 9. As a result, the flow around permanent magnets 10 received in pockets 9 is promoted further. Axial channels 18 are formed on the shorter sides of pocket 9, said sides being oriented parallel to radial channels 13.

Due to the division of radial channel 13 in the embodiment shown in FIG. 2, the ratio between the width of radial channel 13, therefore, its axial extent parallel to longitudinal axis 19 of rotor lamination stack 5, and the axial extent (L) of annular channel 12 is between 80%×L/2 and 95%×L/2.

In particular, FIG. 3 also shows that radial channel 13 opens centrally into pocket section 17 of pocket 9. The width of the pocket cross section here is between 5% and 10% greater than the thickness of permanent magnet 10 received in pocket 9.

The method of the invention for producing a rotor 3 for an EC motor 1 will be explained again in more detail hereinbelow. A rotor shaft 7 and a rotor lamination stack 5 having a passage opening 4 are provided in a first step. Pockets 9 for receiving permanent magnets 10 are formed in rotor lamination stack 5. Permanent magnets 10 are then inserted into pockets 9 of rotor lamination stack 5 and combined into a unit with at least one balance ring 16. This unit together with rotor shaft 7 is then centered relative to one another in a casting mold, namely such that an annular channel 12 is formed between rotor shaft 7, received in passage opening 4, and rotor lamination stack 5. After the mold is closed, casting compound 8 is then introduced into the mold under pressure via a sprue channel. This takes place substantially exclusively via the front opening of annular channel 12 between rotor shaft 7 and rotor lamination stack 5. Casting compound 8 then flows into pockets 9 with permanent magnet 10 received therein through radial channels 13, which are formed in rotor lamination stack 5 and are connected to annular channel 12 in a fluid-conducting manner. After casting compound 8 cures, permanent magnets 10 are then secured in the pockets, so that the cast rotor 3 can be removed from the mold.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electronically commutated (EC) motor for an electric hand tool, the EC motor comprising:
   a rotor;
   a stator in which the rotor is rotatably mounted;
   a rotor lamination stack that has a passage opening and is formed of individual laminations; and
   a rotor shaft that is cast in the passage opening of the rotor lamination stack via a casting compound;
   a plurality of permanent magnets adapted to be received in pockets formed in the rotor lamination stack; and
   an annular channel connected to the pockets in a fluid-conducting manner via at least two radial channels, each of the at least two radial channels being formed of at least two channel sections formed in adjacent laminations of the rotor lamination stack, the annular channel being formed between the rotor shaft and a wall of the passage opening for supplying the casting compound from the annular channel to the pockets,
   wherein between 70% and 98% or between 80% and 95% the laminations of the rotor lamination stack have pocket sections that are connected to the passage opening in a fluid-conducting manner via the channel sections and a remainder of the laminations of the rotor lamination stack do not have channel sections such that the pocket sections are spatially separated from the passage opening, and
   wherein the channel sections each extend from the passage opening to the pocket sections, such that a first end of each of the channel sections opens directly into the passage opening and an opposing second end of each of the channel sections opens directly into a respective one of the pocket sections.

2. The EC motor according to claim 1, wherein the radial channel is connected in a fluid-conducting manner to at least one axial channel formed in the pockets.

3. The EC motor according to claim 2, wherein at least the axial channel and the radial channel are provided in each case multiple times per pocket.

4. The EC motor according to claim 1, wherein a ratio between a width of the radial channel and an axial length (L) of the annular channel as a function of a number (n) of the radial channels per pocket is between 70%×L/n and 98%×L/n, or between 80%×L/n and 95%×L/n.

5. The EC motor according to claim 1, wherein the opening of the radial channel into the pocket is located in a center of the pocket.

6. The EC motor according to claim 1, wherein a width of the pocket cross section is between 1% and 10% or between 2% and 5% greater than a thickness of the permanent magnets received in the pockets.

7. The EC motor according to claim 2, wherein the at least one axial channel is formed on at least one side of the pocket.

8. The EC motor according to claim 1, wherein the casting compound is formed of a thermosetting plastic.

9. The EC motor according to claim 1, wherein a balance ring is disposed on at least one end face of the rotor lamination stack.

10. A method for producing a rotor for an electronically commutated (EC) motor, the method comprising:
    providing a rotor shaft;
    providing a rotor lamination stack having a passage opening with pockets for receiving permanent magnets, wherein between 70% and 98% or between 80% and 95% of laminations of the rotor lamination stack have pocket sections that are connected to the passage opening in a fluid-conducting manner via channel sections and a remainder of the laminations of the rotor lamination stack do not have channel sections such that the pocket sections are spatially separated from the passage opening;
    inserting the permanent magnets in the pockets of the rotor lamination stack;
    inserting the rotor shaft and the rotor lamination stack centered relative to one another in a casting mold such that an annular channel is formed between the rotor shaft, received in the passage opening, and the rotor lamination stack;

closing the mold;

supplying a casting compound under pressure via a sprue channel substantially exclusively in a front opening of the annular channel between the rotor shaft and the rotor lamination stack through radial channels formed in the rotor lamination stack into the pockets with the permanent magnets received therein;

curing the casting compound; and removing the rotor from the mold, wherein the channel sections each extend from the passage opening to the pocket sections, such that a first end of each of the channel sections opens directly into the passage opening and an opposing second end of each of the channel sections opens directly into a respective one of the pocket sections.

11. The EC motor according to claim 1, wherein one of the laminations of the rotor lamination stack that do not have channel sections is provided in a middle of the rotor lamination stack.

12. The method according to claim 10, wherein one of the laminations of the rotor lamination stack that do not have channel sections is provided in a middle of the rotor lamination stack.

* * * * *